United States Patent [19]
Pandula

[11] Patent Number: 5,559,841
[45] Date of Patent: Sep. 24, 1996

[54] DIGITAL PHASE DETECTOR

[75] Inventor: Louis Pandula, Sunnyvale, Calif.

[73] Assignee: VLSI Technology, Inc., San Jose, Calif.

[21] Appl. No.: 500,416

[22] Filed: Jul. 10, 1995

[51] Int. Cl.⁶ ..................................... H03D 3/24
[52] U.S. Cl. .................. 375/375; 375/327; 375/376; 331/1 R; 331/25; 327/149; 327/158
[58] Field of Search ....................... 375/376, 375, 375/326, 327; 178/69.5 R; 331/14, 1 R, 17, 25, 1 A; 327/149, 150, 158, 159

[56] References Cited

U.S. PATENT DOCUMENTS

| | | | |
|---|---|---|---|
| 3,746,800 | 7/1973 | Stuart | 178/69.5 R |
| 3,778,550 | 12/1973 | David et al. | 178/69.5 R |
| 3,840,821 | 10/1974 | Conway | 331/14 |
| 4,535,459 | 8/1985 | Hogge, Jr. | 375/80 |
| 4,933,890 | 7/1990 | Nuytkens et al. | 364/721 |
| 5,222,144 | 6/1993 | Whikehart | 381/15 |

Primary Examiner—Stephen Chin
Assistant Examiner—Don Vo
Attorney, Agent, or Firm—Patrick T. King

[57] ABSTRACT

An improved digital phase detector is used in a digital phase lock loop having a digitally controlled oscillator which includes a state controller and a counter. One embodiment of the phase detector includes a digital integrator; a first register and a first absolute value function; a second register and a second absolute value function; and a subtractor. In another embodiment the integrator includes a tapped delay line and a parallel summing network. The summing network includes a flow counter. The invention to provide a mechanism for ensuring the symmetry of the integration intervals of an early/late gate phase detector in the presence of phase error and to achieve relaxed timing for the phase error calculation without shortening the integration intervals to less than half a bit time while providing a valid phase error output once for each bit period.

21 Claims, 15 Drawing Sheets

FIG._1
(PRIOR ART)

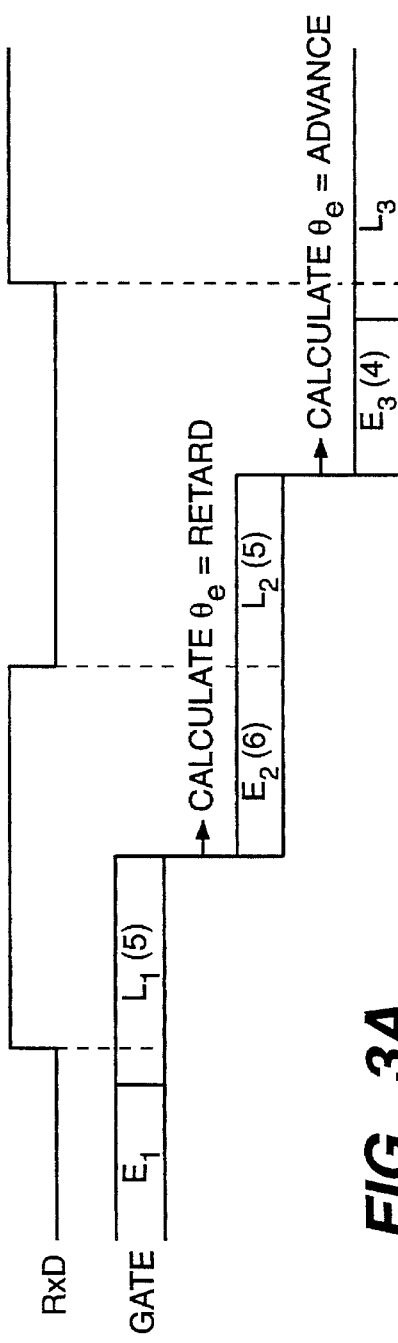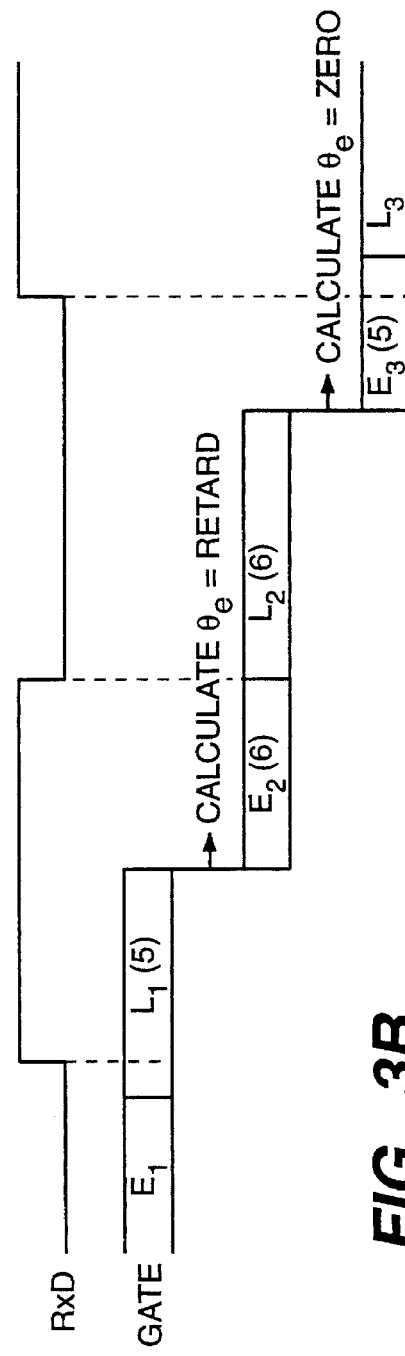

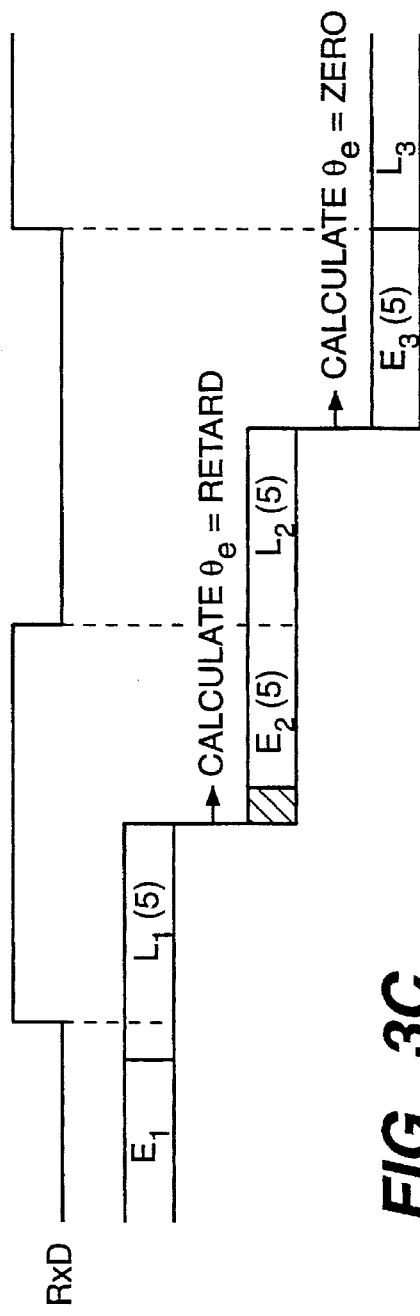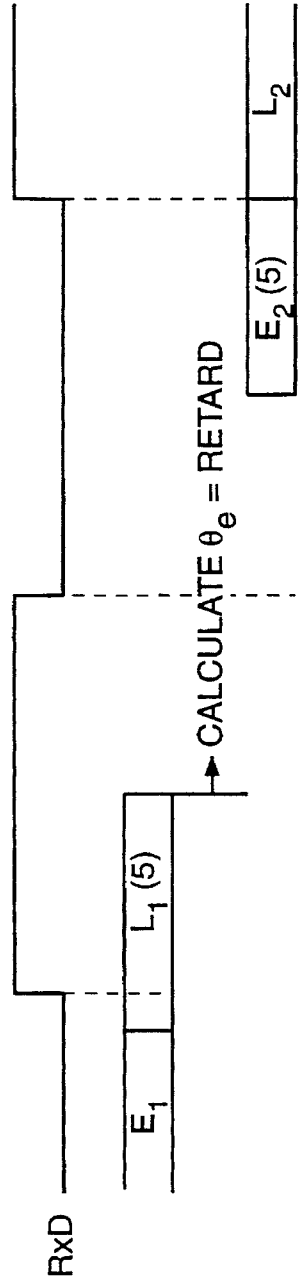

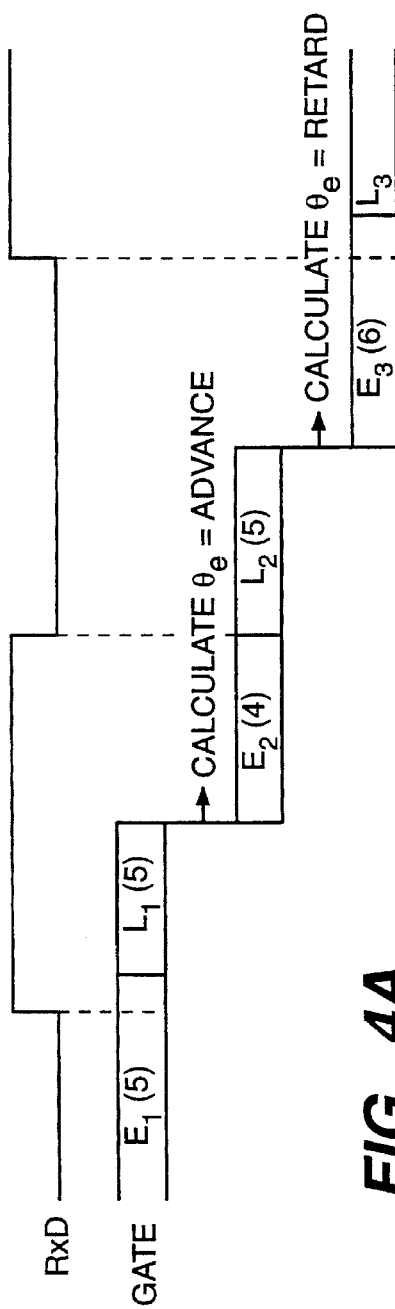
FIG._4A
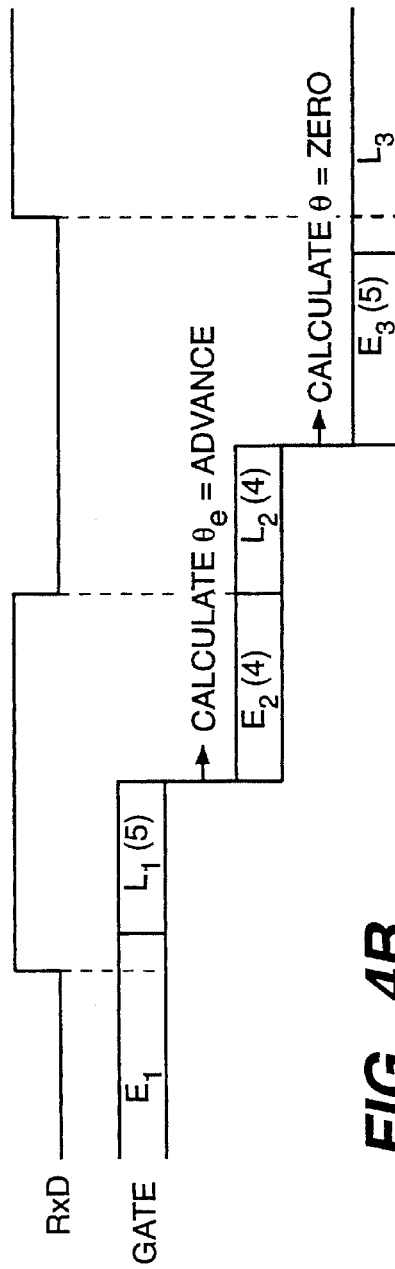
FIG._4B

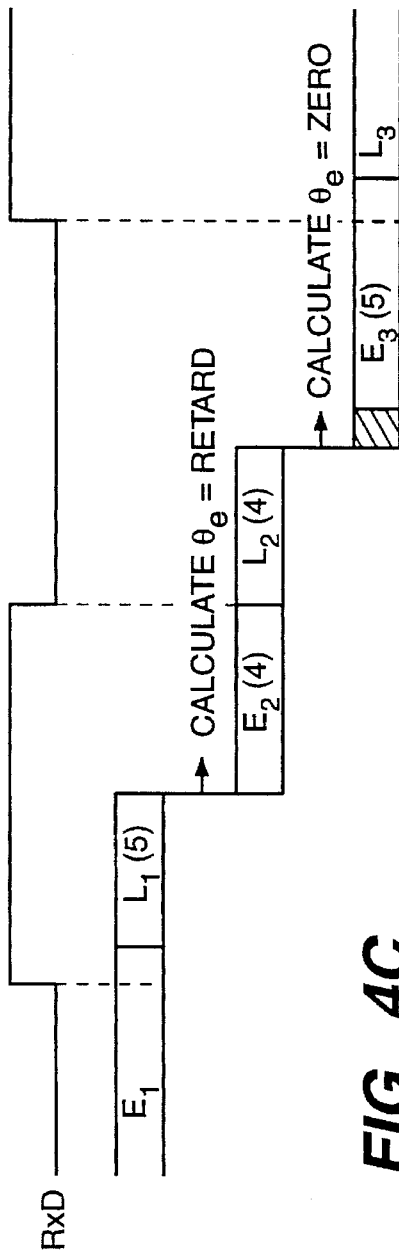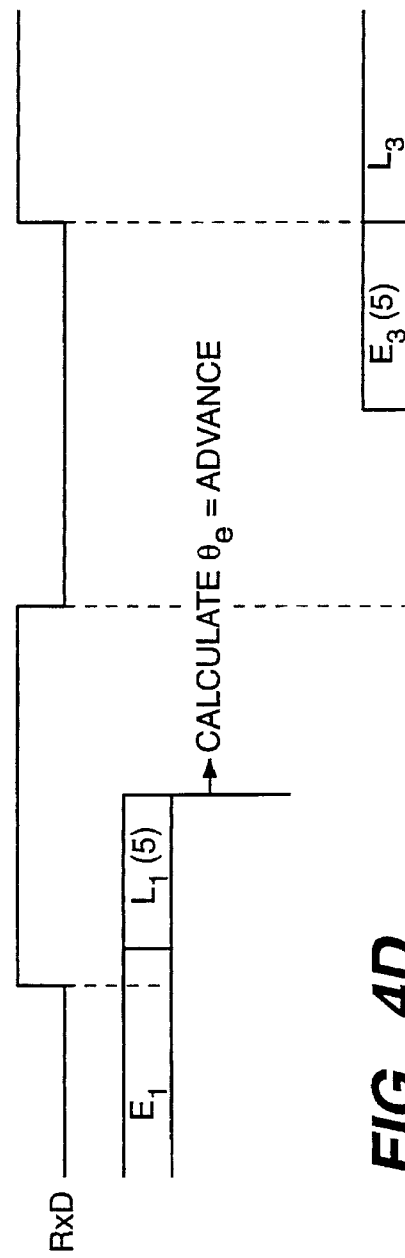

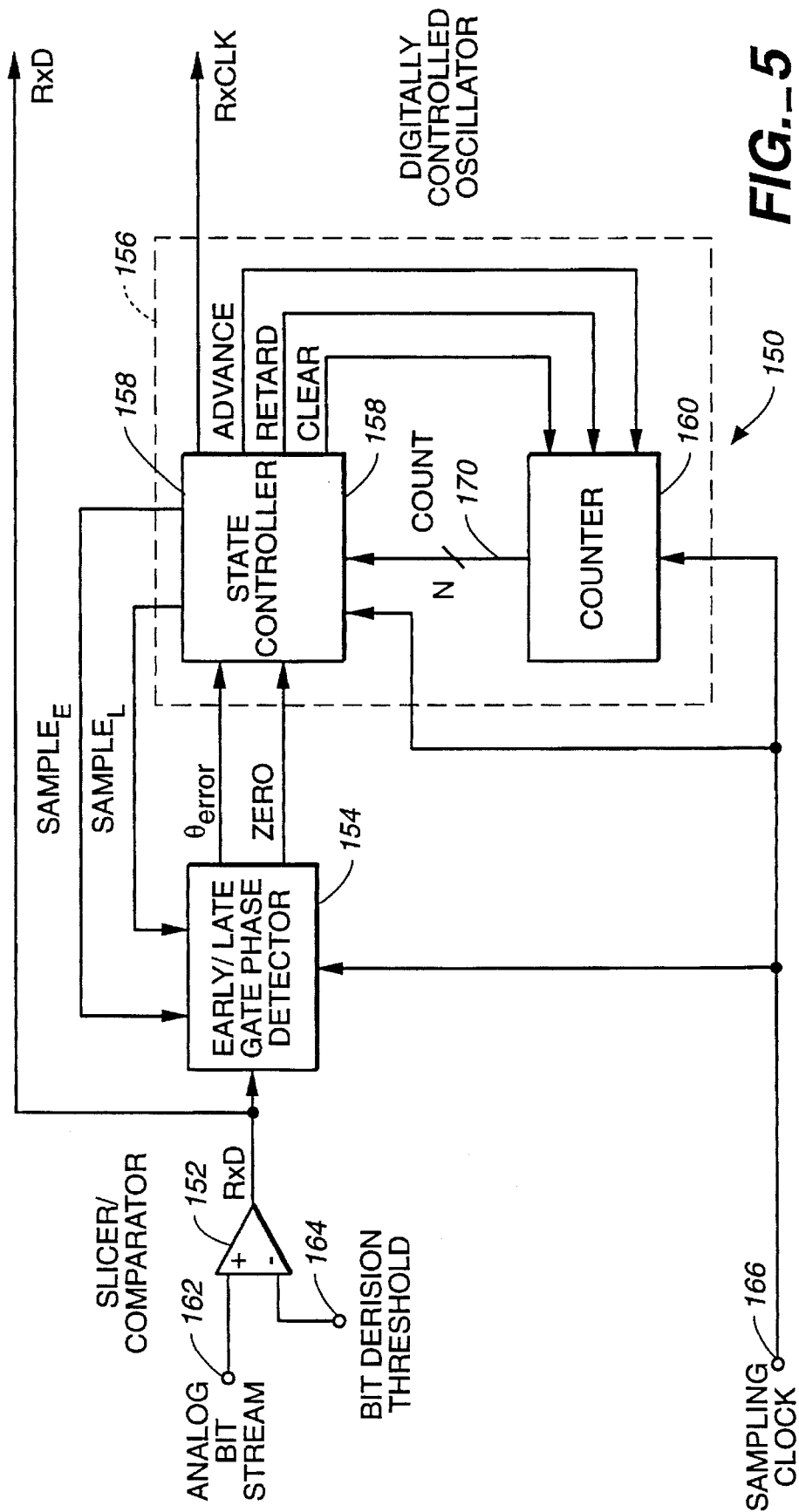
FIG._5

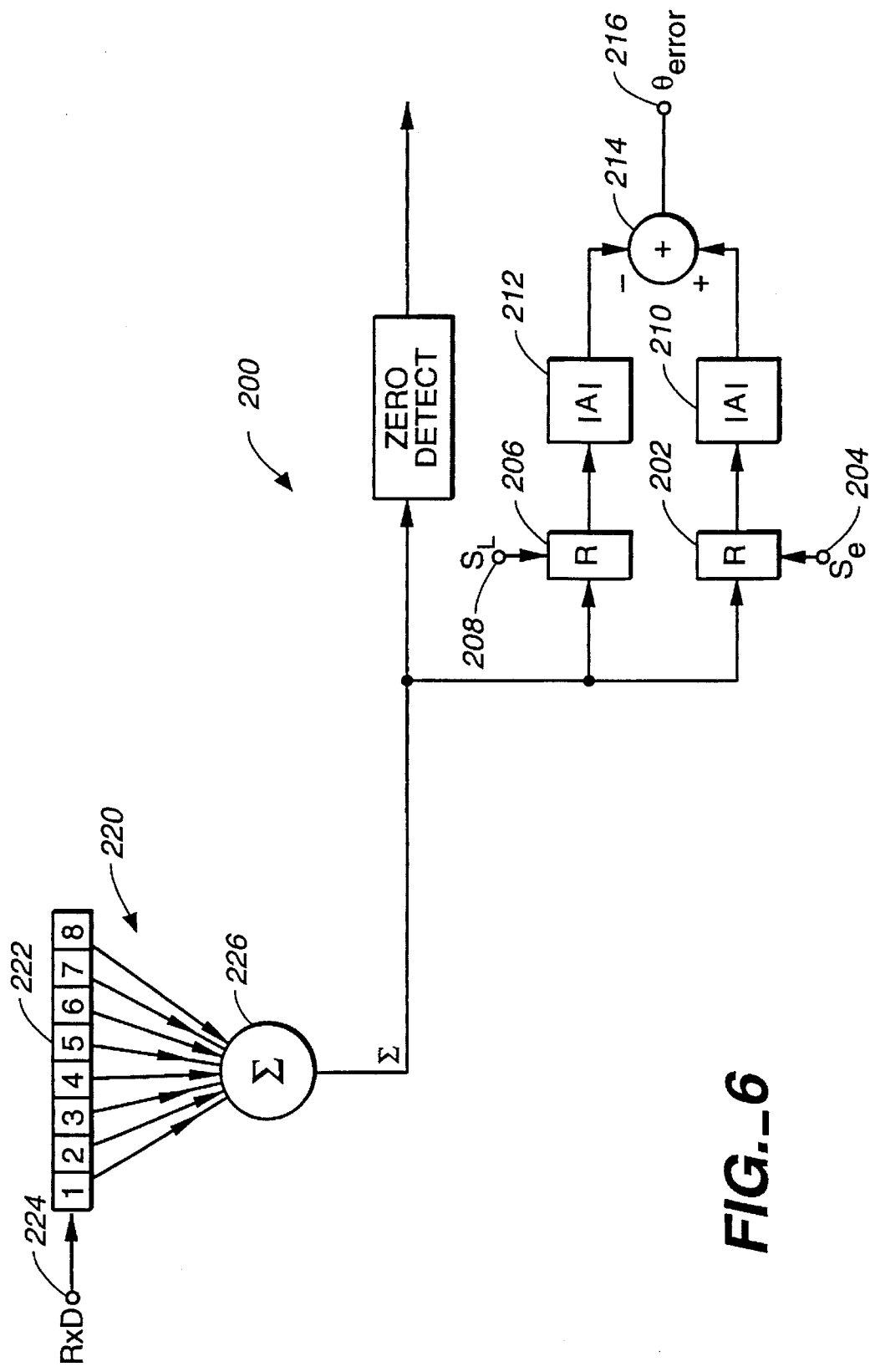
FIG._6

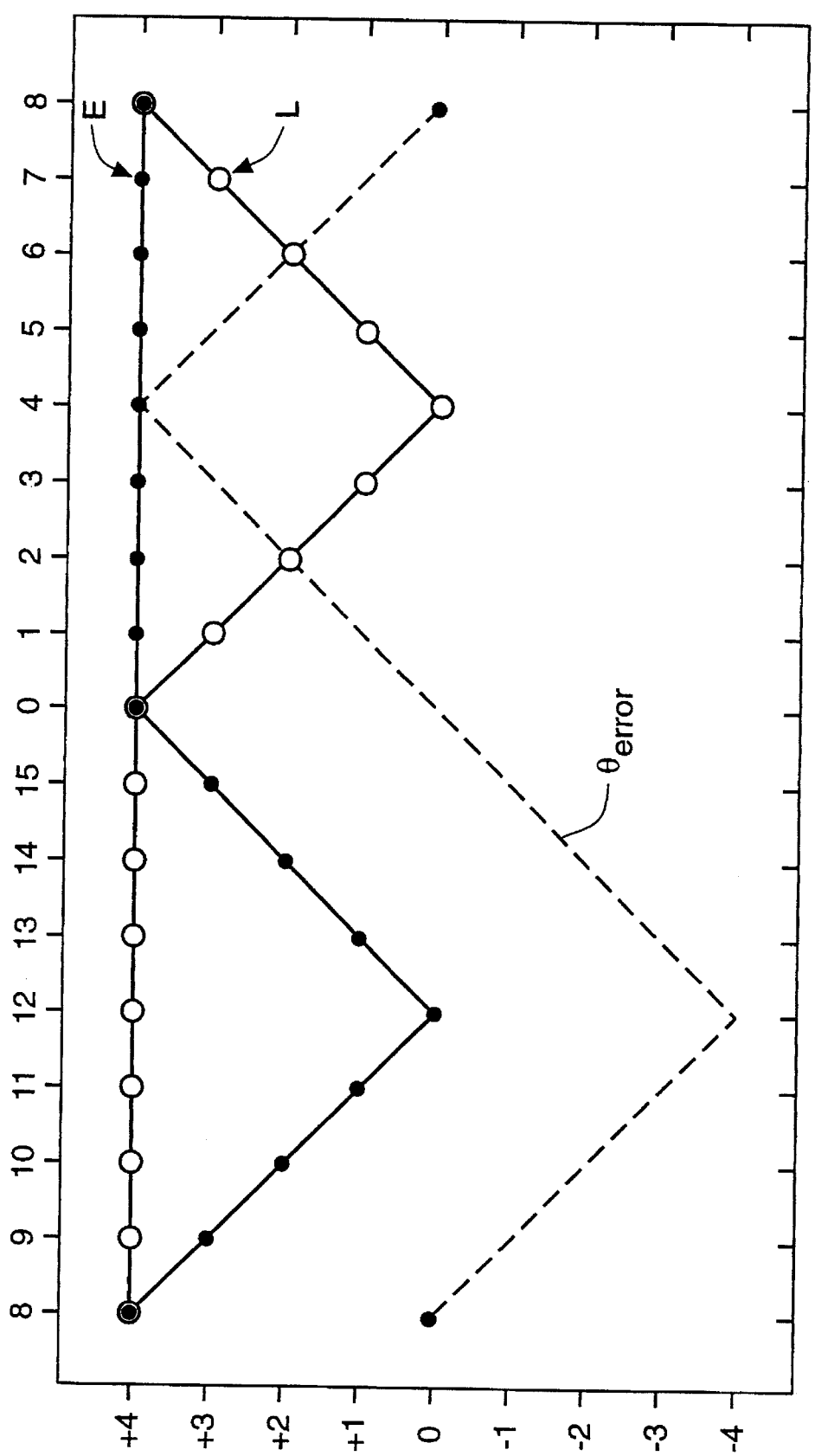
FIG._7

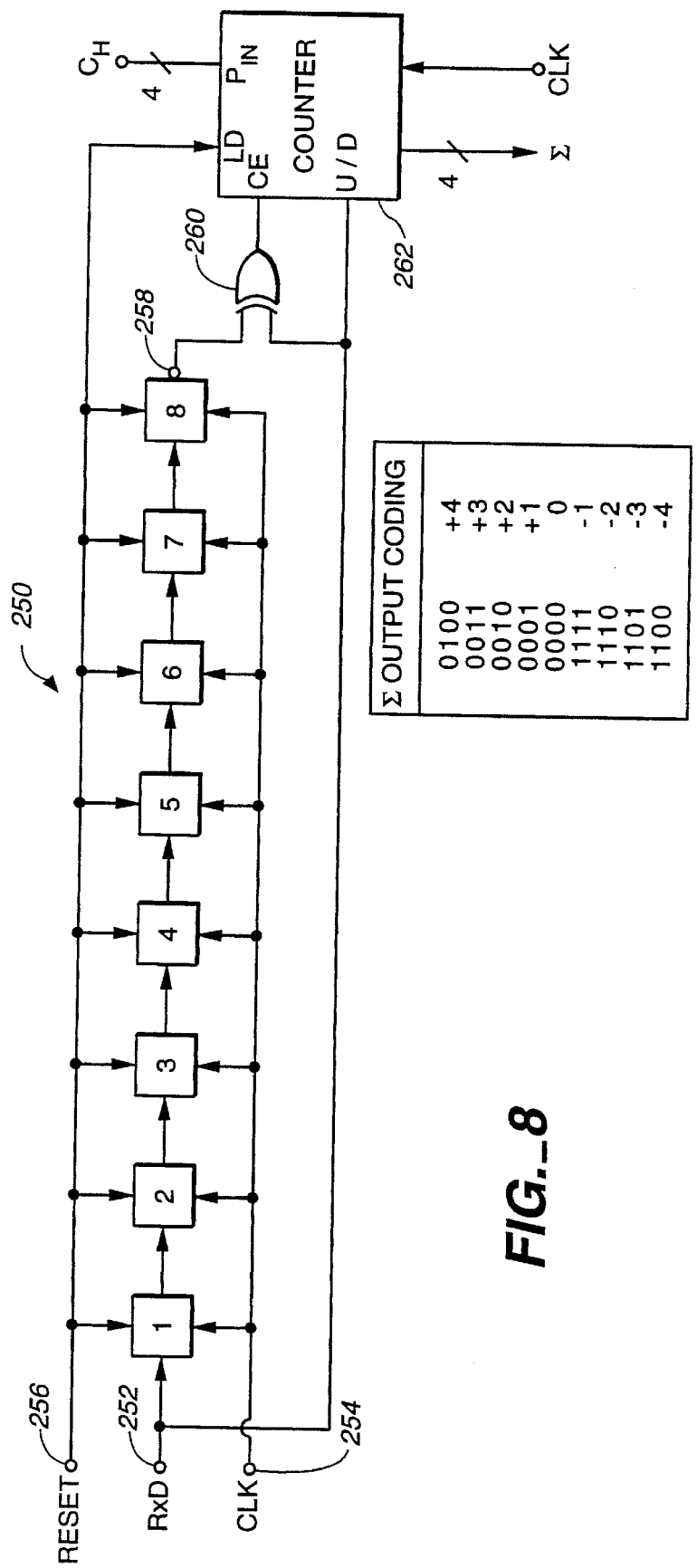
FIG._8

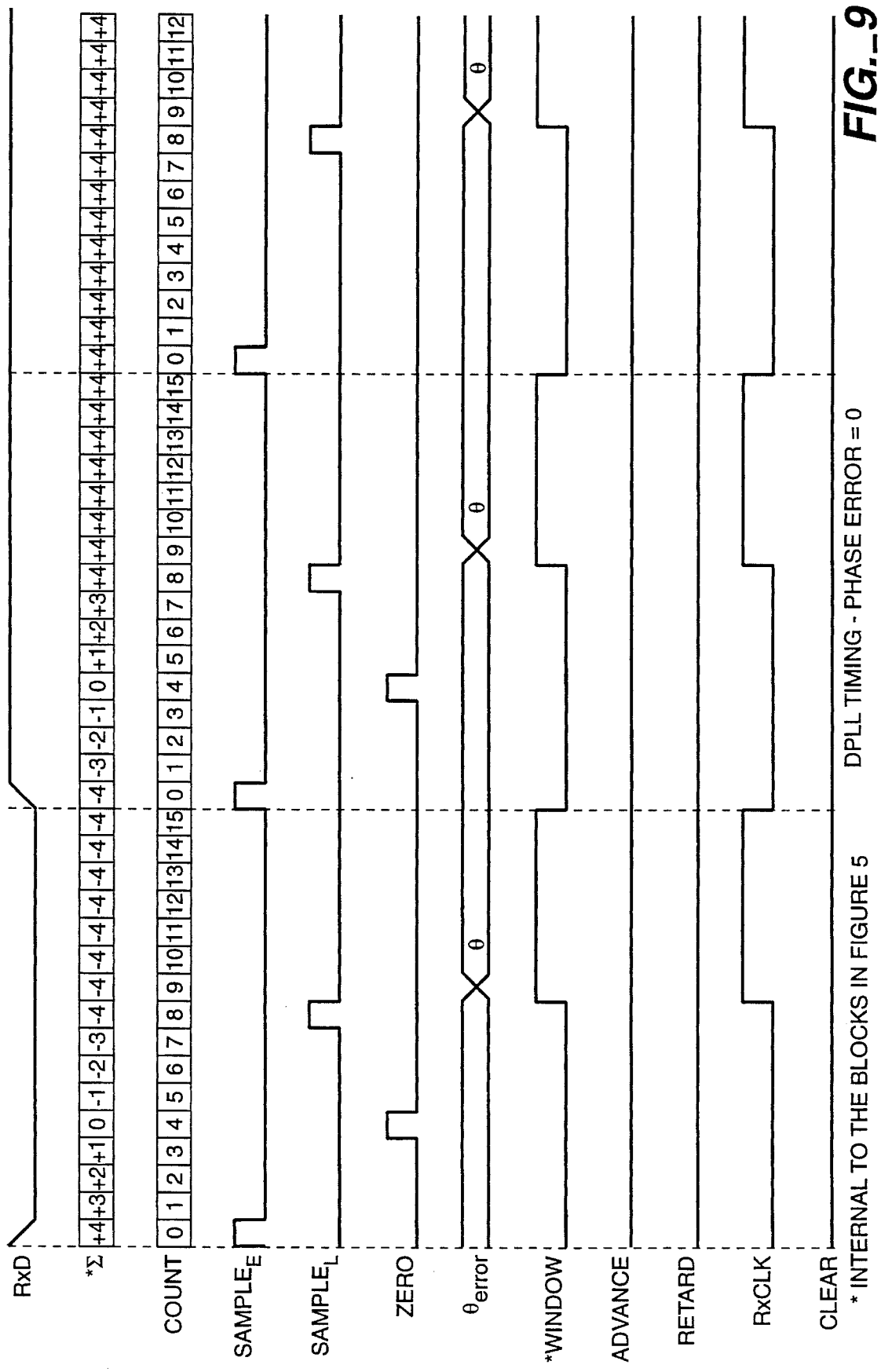

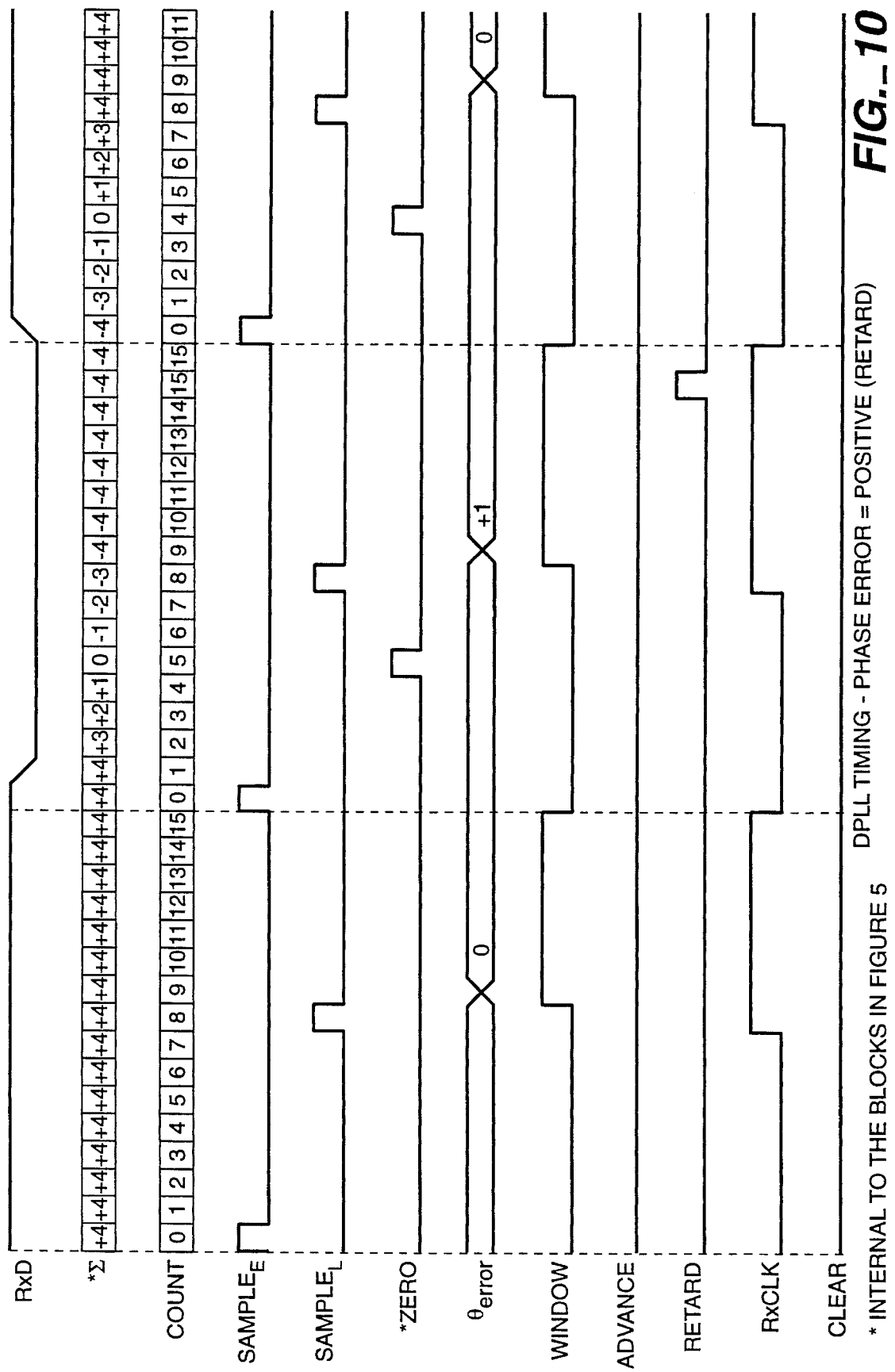
FIG._10  DPLL TIMING - PHASE ERROR = POSITIVE (RETARD)
* INTERNAL TO THE BLOCKS IN FIGURE 5

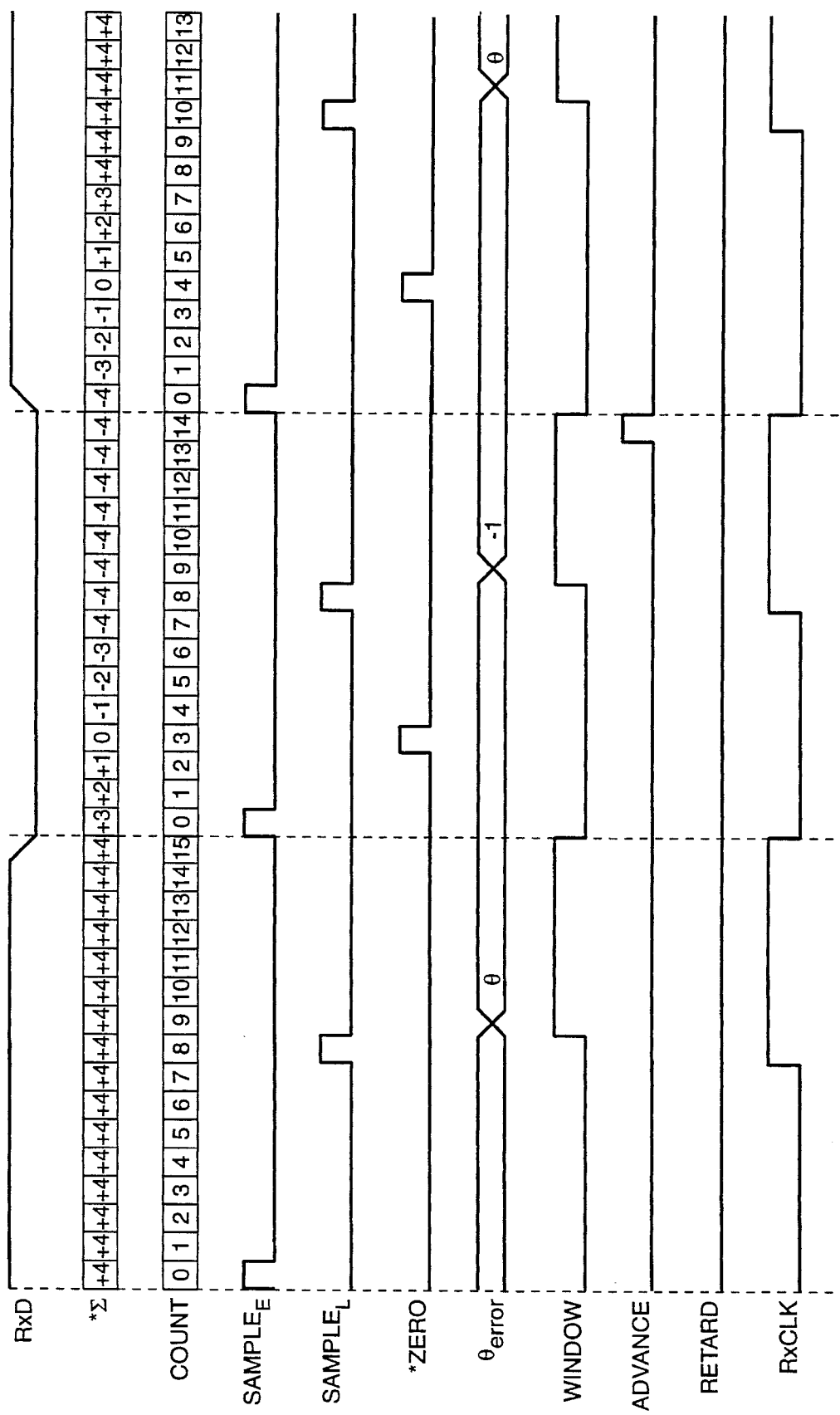
FIG._11

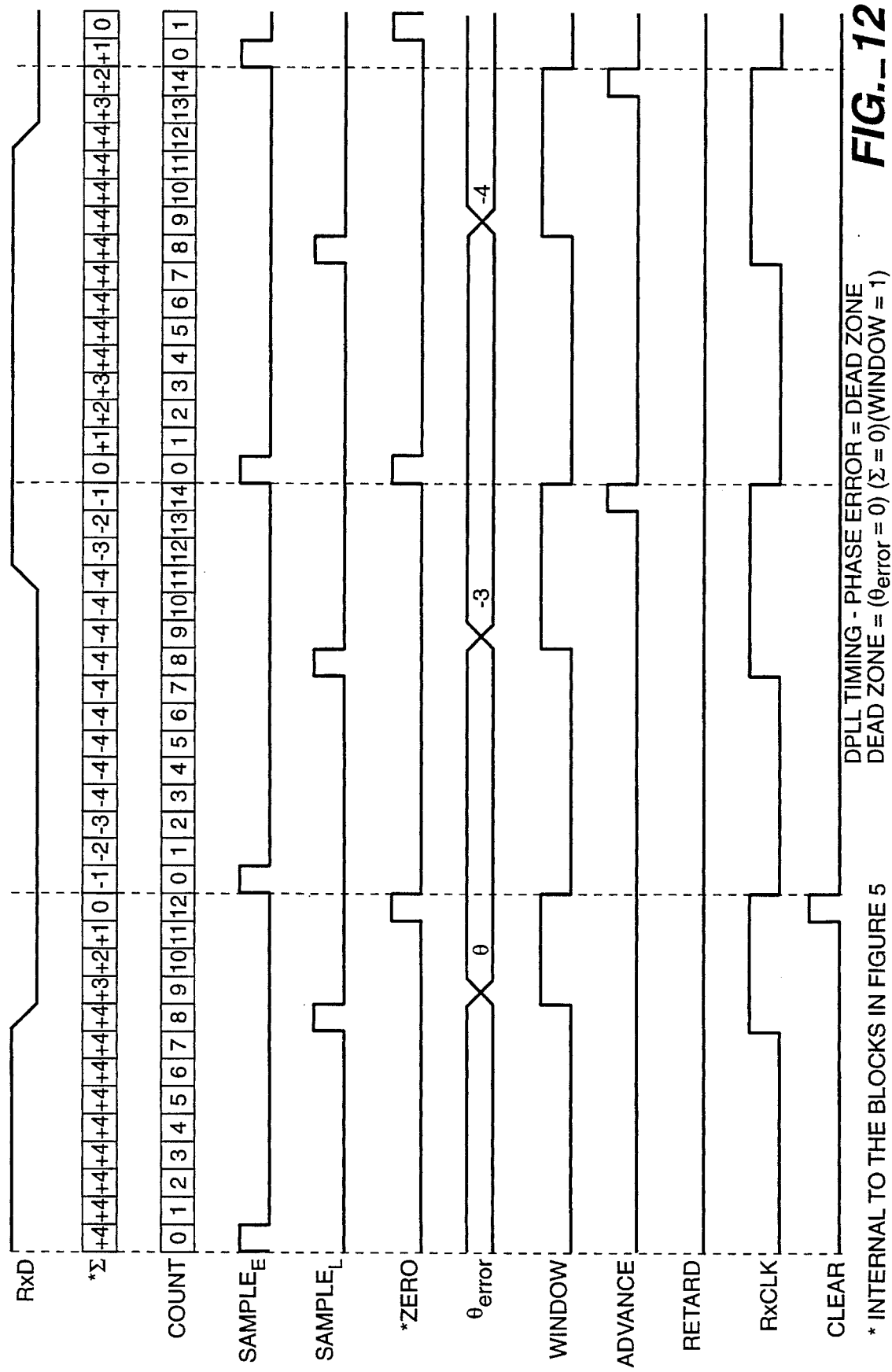
FIG._12

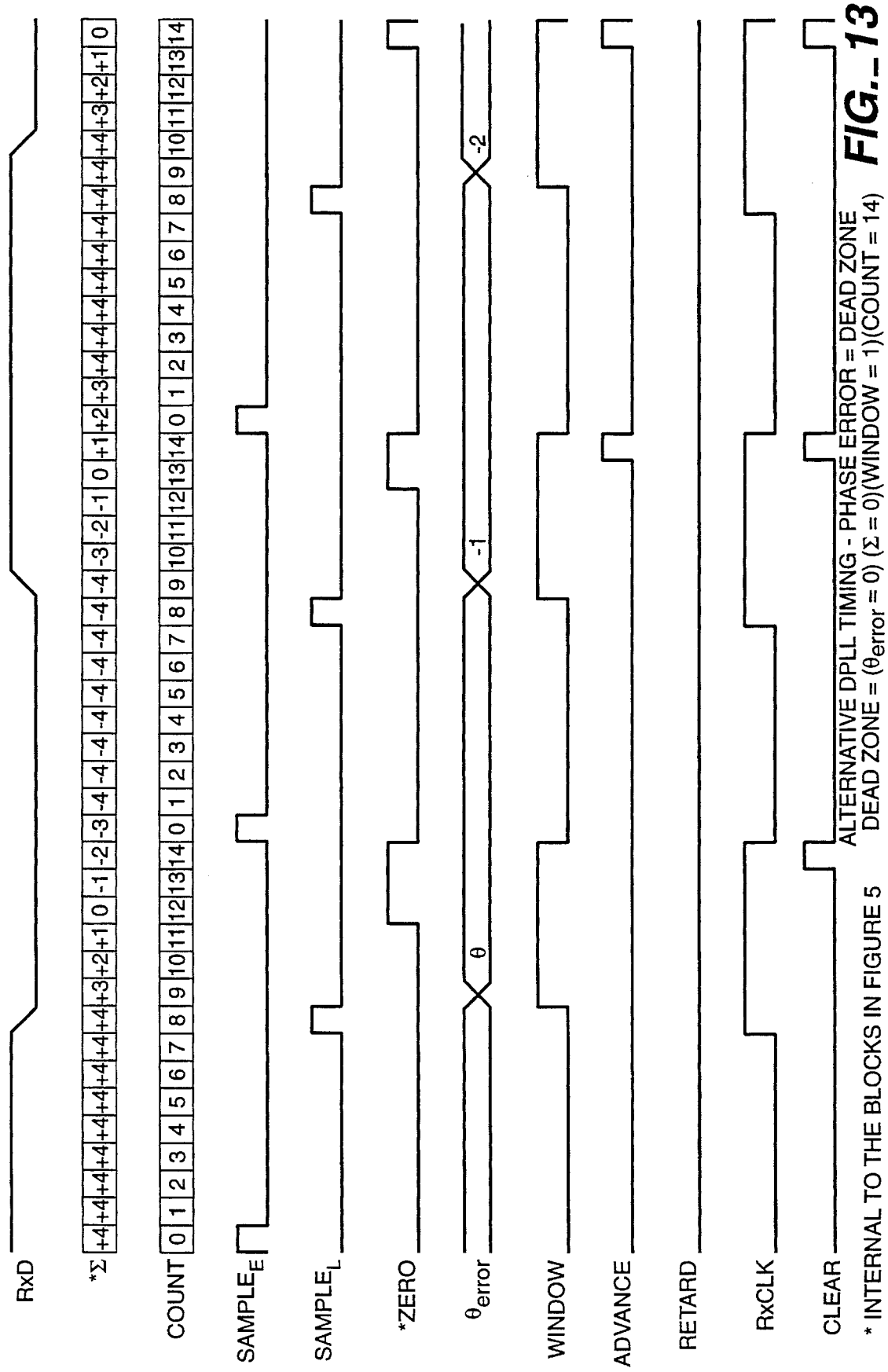
FIG._13

DIGITAL PHASE DETECTOR

TECHNICAL FIELD

The present invention relates generally to digital phase detectors and, more particularly, to digital phase detector based on the early/late gate principle.

BACKGROUND OF THE INVENTION

FIG. 1 shows a prior art phase lock loop 100 which uses an early/late gate phase detector scheme. The operation of the early/late gate phase detector in a phase lock loop is documented in Gardner's book titled "Phaselock Techniques" 2d Edition on pages 235–241. A data bit stream is applied to an input terminal 101 of an early/late gate phase detector. The early/late gate phase detector includes a pair of gated integrators 102, 104. Each of the gated integrators alternately integrates an input data signal over one-half of a time interval T/2, where T is the bit time interval. Integration is performed by the early gated integrator 102 just prior to a bit transition and by the late gated integrator 104 just after a data bit transition. Each integrator 102, 104 is followed by a respective sample-and-hold circuit 106, 108 and a full-wave rectifier 110, 112 or an absolute value circuit. The output signals of the full-wave rectifier circuits 110, 112 are subtracted in a subtractor circuit 114 to provide an error signal. The error signal is filtered in a low pass filter 116 to provide a control signal for a voltage controlled oscillator (VCO) 118. The VCO 118 provides an output clock signal at a terminal 120 The output clock signal at terminal 120 is provided to a timing circuit 122 which provides signals to control the timing of the two integrators 102, 104 and their respective sample-and-hold circuits 106, 108.

FIG. 2 shows the operation of the phase lock loop of FIG. 1. In the absence of any phase error and noise, the integral from the early and late integrators are equal in magnitude and the difference between the absolute value of these magnitudes is zero. Note that the relative sign of the two integrals is dependent on the bit pattern of the input data signal, but following full-wave rectification or an absolute value function, the polarity of the bit pattern of the input data signal is removed and does not affect operation of the phase detector.

In the presence of a phase error between the transition point of the two integration intervals and a data transition of the input data signal, the integration intervals are asymmetric so that the data transitions of an input data signal fall into either one of the two integration intervals. This reduces the magnitude of one of the integrated values so that the difference between the absolute value of the two integrated values is non-zero and its sign indicates the direction of the phase error.

It is desired that the end of the early integration interval coincide with the bit transition boundary and the start of the late integration interval. If some phase error exists between the bit steam and the timing of the early/late integration intervals, the loop VCO is either advanced or retarded to realign the position of the early/late gate boundary to coincide with the bit transition bounding.

Because of its relative complexity, the early/late gate phase detector has found limited application in data timing recovery. As a consequence, simpler phase detection techniques have found broader acceptance despite their poorer performance in low signal to noise ratio applications. With the rapid growth of wireless communications systems, and their inherent need to operate over a broad range of signal to noise ratios, there is renewed interest in the more robust performance that is possible with an early/late gate phase detector.

Early/Late Gate Transition Advanced Relative To The Bit Stream

FIGS. 3A to 3D show the case of the early/late gate transition being advanced relative to the received data bit stream RxD and some alternative gate timing schemes that are used to reestablish synchronization. The data bits have a period of 10 clock cycles. An early gate signal E and a late gate signal L are provided as signals having period of an integer number of clock cycles, for example, five clock cycles.

In FIG. 3A, the length of the early gate (E2) has been extended by one clock cycle while the length of the late gate (L2) has been unchanged. This temporarily brings the gates into alignment with the bit stream but causes an artificial phase error because of the difference in the length of the gates. The artificial phase error which is calculated with the lengthened early gate E2 and the late gate L2 produces a phase error signal $Q_e$ which advances the phase of the gate signals.

In FIG. 3B, the lengths of both the early and late gates (E2 and L2) have been extended by one clock cycle. This brings the gates into alignment with the bit stream and provides a correct phase error calculation but forces the following gates periods (E3 and L3) to be skewed out of alignment with the data stream.

FIG. 3C shows the length of both E2 and L2 unchanged with the start of E2 being delayed by one clock cycle from L1. This provides the proper timing while simultaneously maintaining the integrity of the phase error calculation. The one drawback to this timing is that it requires that the phase error calculation be completed in the short time interval between the end of L1 and the start of E2 to properly initiate the start of E2. This will set an upper limit on the sampling rate of a phase detector that uses this tinting.

FIG. 3D shows an alternative to the options discussed above, which is to sample the early and late gates every other bit time. This allows the gates to maintain a fixed length and to provide additional time to complete the phase error calculation. However, this approach requires a higher data transition density to maintain timing lock.

Early/Late Gate Transition Retarded Relative To The Bit Stream

Similarly, FIGS. 4A to 4D show gate timing options when the early/late gate transition is retarded relative to the received data bit stream RxD.

In FIG. 4A, E2 has been shortened while L2 is unchanged. This causes the gates to align with the bit stream but also generates an erroneous phase error calculation because of the difference in the length of the two gates.

In FIG. 4B, both E and L2 have been shortened by the same amount to allow a valid phase error calculation. However, the following gates (E3 and L3) are forced into misalignment.

In FIG. 4C, both E2 and L2 have been shortened by one clock cycle and the start of E3 has been delayed by one clock. This provides correct alignment for the entire bit sequence and guarantees that all the phase error calculations are performed correctly. Note however, that the phase error calculation following L2 must be performed in one clock cycle because the start of E3 must be adjusted accordingly based on the outcome of this calculation.

FIG. 4D shows an alternative to the timing options discussed above would be to use early and late gates that are always shorter than half a bit time. This would eliminate the need to shorten the gates when it is necessary to advance the timing and would thus simplify the operation of the phase detector. An additional drawback to this approach, however, is that shortening the gates expands the dead zoned in the phase detector transfer function and makes it more likely that the phase locked loop will synchronize 180° out of phase with the bit stream.

Conventional early/late gate phase detectors suffer from timing constraints which are imposed by the sequential integration functions which are used for detecting and sampling the bits of the input data steam. These timing constraints may require the gate times of the early and late gates be shortened and thus expand the "dead zones" in the phase detector transfer function. Alternatively, these timing constraints may require that the loop phase error be calculated at half the bit rate, thereby increasing the transition density required from the serial bit stream. Finally, these timing constraints may limit the sampling rate achievable with a phase detector, which ultimately limits the bit rate of a data stream being processed.

Thus, a need exists for increasing the usefulness of an early/late gate phase detector by ensuring the symmetry of the integration intervals for an early/late gate phase detector in the presence of phase errors and by providing relaxed timing conditions for a phase error calculation in such a phase detector.

SUMMARY OF THE INVENTION

It is, therefore, an object of the present invention to provide a mechanism for ensuring the symmetry of the integration intervals of an early/late gate phase detector in the presence of phase error and to achieve relaxed timing for the phase error calculation. This is achieved without shortening the integration intervals to less than half a bit time while providing a valid phase error output once for each bit period.

In accordance with this and other objects of the invention, an improved digital phase detector is provided for use in a digital phase lock loop having a digitally controlled oscillator which includes a state controller and a counter. The digital phase detector includes a digital integrator, having an input terminal for receiving binary samples of a data stream, where the sample rate of the binary samples is x times the data rate of the data stream. The digital integrator has an output terminal at which is provided the sum of n binary samples. A first register samples and holds the output value of the digital integrator. A first absolute value function takes the absolute value of the output value of first register. A second register samples and holds the output value of the digital integrator. A second absolute value function takes the absolute value of the output value of the second register. A subtractor subtractively combines the absolute value of the output value of the first register and the absolute value of the output value of the second register to providing an output error signal.

One embodiment of the integrator includes a tapped delay line and a parallel summing network having input terminals connected to respective output terminals of the tapped delay line.

In another embodiment of the invention, the summing network includes a flow counter. The flow counter is initialized to its lowest output code when the shift register is reset. As each input sample is shifted into the delay line, the state of the flow counter is updated based on the state of the delay line input and output values; wherein, if the input and output are the stone, then the counter does not change its count; wherein, if the input is a one while the output is a zero, then the counter increments by one; and wherein if the input is a zero and the output is a one, then the counter decrements by one; whereby the flow counter keeps track of samples flowing in and out of the delay line and maintains a count equal to the integral of the samples present in the delay line at any instant in time.

The counter is initialized such that it provides two's complement output coding, which simplifies computation of the absolute value later in the phase detector by providing the sign in the most significant bit.

The integration interval maintains a fixed length regardless of when the integrator is sampled to allow the early and late gates to be arbitrarily shifted around during a bit period without affecting their length. The length of the tapped delay line in this case is equal to the early or late gate length, which is half a bit period. The tapped delay line includes a shift register. An input data signal is sampled at between 8 to 64 times the bit rate and shifted into the delay line. The summing network includes full adders that sum up the number of delay line elements containing ONE bits. A zero detector is provided at the output terminal of the digital integrator.

This invention augments the early/late gate architecture with a real-time, sliding integrator. The integrator provides a sliding integration function which provides a real-time sample of the signal integral over the last half bit period and circumvents the timing constraints inherent to the classical early/late gate architecture. In addition, the sliding integration function provides a simple means of detecting the dead zone in the phase detector transfer function when the phase error is 180 degrees.

BRIEF DESCRIPTION OF THE DRAWINGS

The accompanying drawings which are incorporated in and form a part of this specification, illustrate embodiments of the invention and, together with the description, serve to explain the principles of the invention:

FIGS. 3A to 3D show timing diagram for a system where the timing for the integrators and hold circuits has 10 clock cycles for each data bit period, where the early/late gate transitions are advanced relative to the bit stream for some alternative gate timings that are used to reestablish synchronization.

FIG. 3A illustrates gate tinting where the length of the early gate (E2) extended by one clock cycle while the length of the late gate (L2) is unchanged.

FIG. 3B illustrates gate timing where the length of both the early and late gates (E2 and L2) are extended by one clock cycle.

FIG. 3C illustrates gate timing where the length of both E2 and L2 are unchanged, with the start of E2 being delayed by one clock cycle from L1.

FIG. 3D illustrates an alternative gate timing which samples the early and late gates every other bit time.

FIGS. 4A to 4D are tinting diagrams for system similar to that illustrated in FIGS. 3A to 3D for cases where early/late gate transitions are retarded relative to the bit stream.

FIG. 4A illustrates gate timing where E2 is shortened while L2 is unchanged.

FIG. 4B illustrates gate timing where both E and L2 are shortened by the same amount to allow a valid phase error calculation.

FIG. 4C illustrates gate timing where both E2 and L2 are shortened by one clock cycle and the start of E3 is delayed by one clock.

FIG. 4D illustrates an alternative gate timing which provides early and late gates that are always shorter than half of a data bit time.

FIG. 5 is a schematic block diagram which illustrates an improved digital phase detector based on the early/late gate principle according to the invention.

FIG. 6 illustrates the phase detector transfer function for the detector of FIG. 5B.

FIG. 7 shows a flow counter as an alternative to the summing network of FIG. 4.

FIG. 8 shows the block diagram of a digital phase locked loop system consisting of a data slicer, early/late gate phase detector, and a digitally controlled oscillator.

FIG. 9 shows a timing diagram for phase-locked loop of FIG. 8 for the case where the phase error is equal to zero.

FIG. 10 shows a timing diagram for phase-locked loop of FIG. 8 for the case where the phase error is positive.

FIG. 11 shows a timing diagram for phase-locked loop of FIG. 8 for the case where the phase error is negative.

FIG. 12 showing a timing diagram which illustrates the capability of a system according to the invention for detecting a dead zone in the transfer function of a phase detector through the use of a sliding integrator.

FIG. 13 shows an alternative to the timing of FIG. 9.

DETAILED DESCRIPTION OF THE PREFERRED EMBODIMENTS

Figure 1:
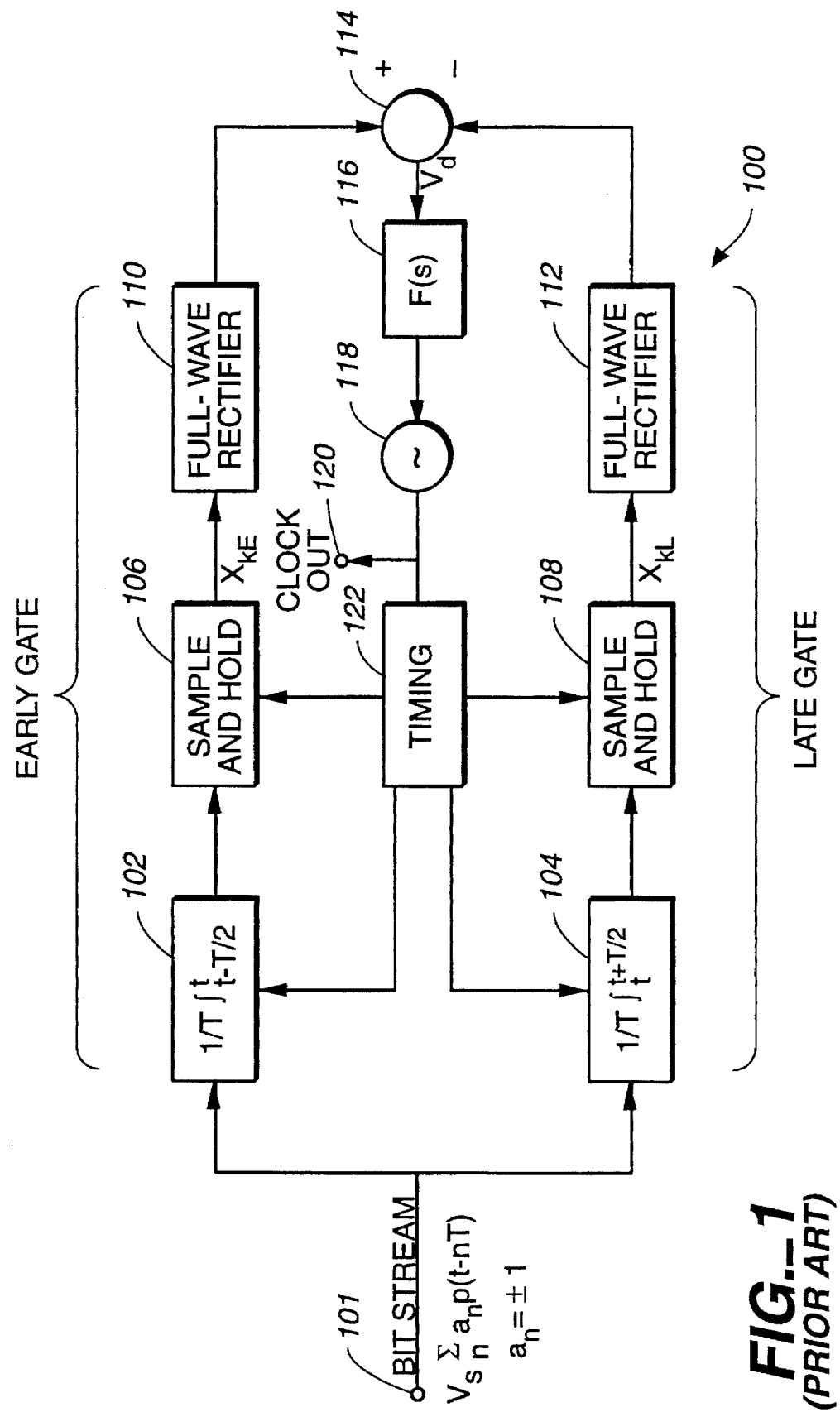
FIG 1 is a schematic block diagram of a prior art phase lock loop which uses an early/late gate phase detector.
Figure 2:
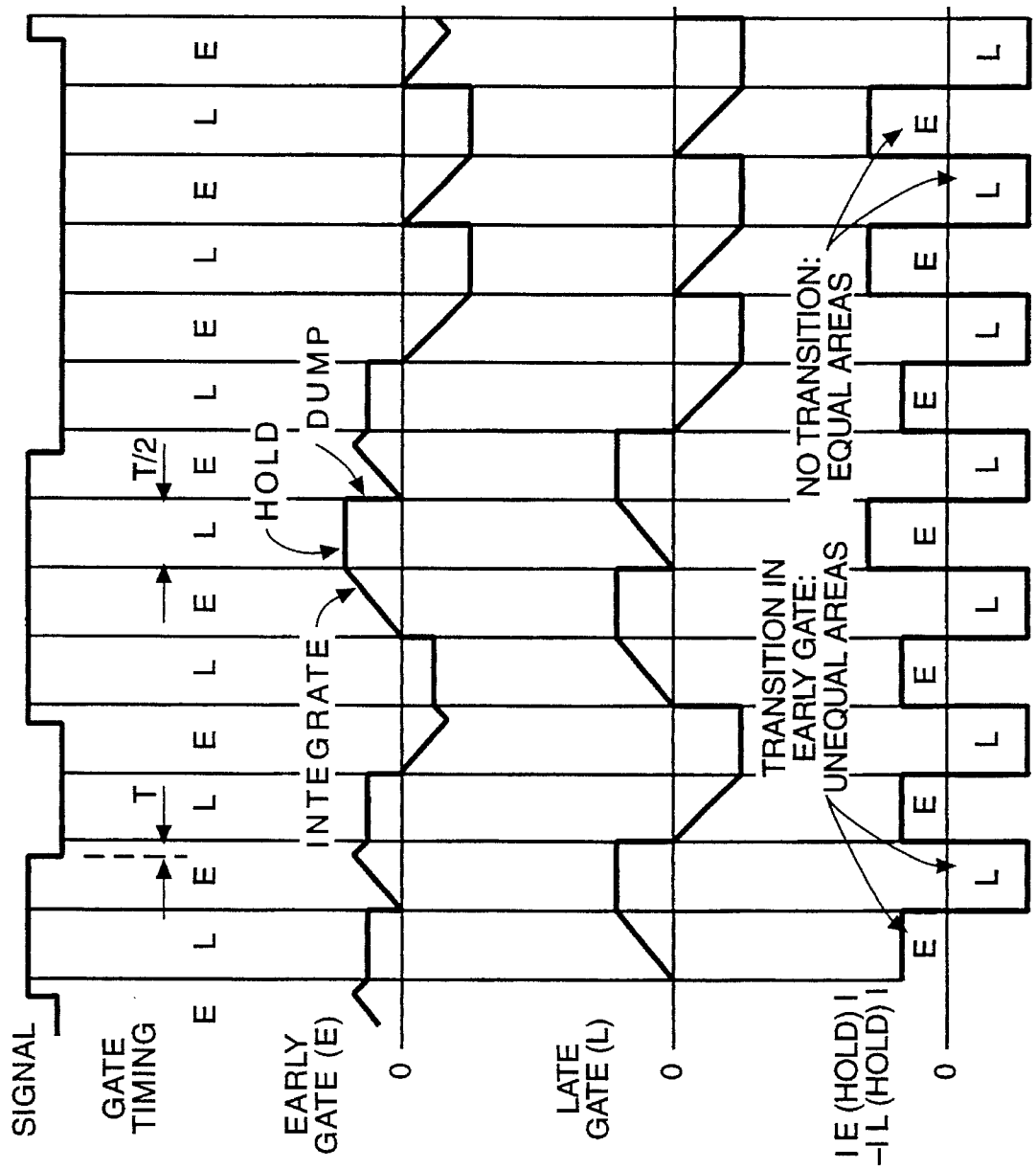
FIG. 2 is a timing diagram illustrating operation of FIG. 1.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

FIG. 5 shows a block diagram of a digital phase locked loop 150 which includes a data slicer/comparator 152, an early/late gate phase detector 154, and a digitally controlled oscillator 156. The digitally controlled oscillator 156 includes a state controller 158 and a counter 160.

The data slicer/comparator 152 receives an analog data bit stream at a positive input terminal 162 and a bit-decision threshold voltage level at a negative input terminal 164. The data slicer/comparator 152 converts the analog bit stream at input terminal 162 to a digital data signal RxD at its output terminal. The digital data signal RxD is suitable for subsequent digital processing.

A sampling clock is provided to an input clock terminal 166. The sampling clock has a rate which is n times the data rate of the digital data signal RxD, where n typically ranges from 8 to 64.

The early/late gate phase detector 154 samples the lower speed digital data signal RxD at its input terminal using the sampling clock 166. An early sample clock signal SAMPLE $_E$ and a late sample clock SAMPLE $_L$ are provided from the state controller 158. Each of these sample clocks has the same rate as the data signal RxD but are variable in phase. The early/late gate phase detector 154 has an early gate integrator which integrates the RxD signal over a time interval which is ended with the early sample clock signal SAMPLE $_E$. The early/late gate phase detector 154 also has a late gate integrator which integrates the RxD signal over a time interval which is ended with the late sample clock signal SAMPLE $_L$. The early and late integrals are compared to provide an error signal Theta error.

The early/late gate phase detector 154 also provides a ZERO output signal which indicates that a data bit transition is present within the proper half bit integration interval. This zero bit is useful for detecting a dead zone in the transfer function of the phase detector. A dead zone occurs when the early-to-late gate transition falls in the middle of a data bit rather than on a data bit boundary. When this occurs, the phase detector output may indicate that the phase error is zero and the phase locked loop will maintain its current phase which is actually 180° in error.

The phase error and zero outputs from the early/late gate phase detector 154 are the input signals to the digitally controlled oscillator 156 which includes the state controller 158 and the counter 160. The counter 160 counts the sampling clock pulses and provides the COUNT value on N output lines of a bus 170. The COUNT value is provided as an input to the state controller 158. The state controller 158 also receives the sampling clock as another input. When the phase error output of the early/late gate phase detector is equal to zero, the counter 160 free runs at the sampling rate and provides a count value to the state controller 158. The state controller 158 uses the count to derive the sampling signals for the phase detector early and late gates.

When the phase error output of the early/late gate phase detector is positive, the state controller 158 provides a RETARD signal to the counter 160 to retard the counter by one count in an attempt to bring the early-to-late gate transition into alignment with the data bit stream transitions. When the early/late gate phase detector phase error output is negative, the state controller 158 provides an ADVANCE signal to advance the counter 160 by one count.

The digital phase locked loop system 150 according to the invention for a dead zone which occurs in the transfer function of the phase detector through the use of a sliding integrator. The integrator output equals zero when a bit transition is present within the half bit integration interval. This allows a zero detector placed at the integrator's output to serve as a bit transition detector. The dead zone occurs when the early to late gate transition falls in the middle of a bit rather than on bit boundaries. When this occurs, the phase detector output may indicate that the phase error is zero and the phase locked loop will maintain its current phase which is actually 180° in error. Although noise and tinting inaccuracies will eventually pull the phase detector out of the dead zone there is no guarantee on the lock-in time. The digital phase lock loop system 150 detects the dead zone by qualifying the zero phase error state with the position of the bit transition. If the phase detector output is zero and a bit transition is detected in the boundary region, or window, between the late and early gates, then the phase detector is operating in the dead zone and its timing is shifted by 90°. This tinting shift is achieved by clearing the counter 160 and forcing the phase detector to operate near the peak of its transfer function.

FIG. 6 illustrates an improved early/late gate digital phase detector 200 according to the invention for use in a digital phase locked loop 150 of FIG. 5. The invention provides a mechanism for ensuring the symmetry of the integration intervals of an early/late gate phase detector in the presence of phase error and provides for relaxed timing for a phase error calculation. This is achieved without shortening the integration intervals to less than half a bit time while providing a valid phase error output once for each bit period.

The sample-and-hold circuits of the prior art of FIG. 1 are replaced by a pair of registers, an early register 200 which has an early sample clock $S_E$ applied to a sample terminal 204 thereof and a later register 206 which has a late sample clock $S_L$ applied to a sample terminal 208 thereof. These are allowed by respective absolute value function 210, 212. The output signals of the absolute value functions 212, 210 are subtracted in the subtractor 214 which provide an error signal θerror of an output terminal 216.

For achieving the goals outlined above, the pair of sequential integrators of FIG. 1 are replaced by a single, real time integrator 220. Rather than generating a valid output only at the end of some predefined integration interval, the output of this type of integrator is always valid for the interval that has just elapsed. In essence, this integrator provides a valid integral for a fixed time interval which terminates at the instant the output of the integrator is sampled.

Typically, this type of integrator 200 is implemented with a tapped delay line 222 having an input terminal 224 for receiving the input data. In this example, the tapped delay line 222 has 8 cells and is clocked at a rate which is 16 times the input data rate. The output terminals of the taps are connected to the input terminal of a parallel summing network 226. The length of the tapped delay line in this case is equal to the early or late gate length, which is half of a data bit period. For digital implementations the tapped delay line includes shift registers. The summing network 226 typically consists of full adders that sum up the outputs of the delay line elements which contain one bits. Additional adders are needed as the number of delay line taps increases.

The early register 202 is enabled and loaded by the early sample clock $S_E$ at the end of the early gate interval. The late register 206 is enabled and loaded by the late sample clock $S_L$ at the end of the late gate interval.

The early/late gate phase detector samples the RXD bit stream at high rate to calculate the integral (a sampling rate of 16× is used for this example) and further samples the integrator output under control of the sample early and sample late inputs from the state controller. Following the sample late command, the phase detector provides a valid phase error output. In addition, the phase detector provides an output that indicates when the integral of the bit stream over the last half bit interval is equal to zero.

FIG. 7 shows the transfer function of the phase detector of FIG. 6 using a counter 160 of FIG. 5 which counts from 0 to a high as 15. When a data transition occurs, the counter is reset to zero. The system of FIG. 5 operates to have the phase error θerror equal to zero. With reference to FIG. 5, the phase error θerror is equal to the algebraic difference between the absolute value of the early sample stored in the early register 202 minus the absolute value of the value of the late sample stored in the late register 206. FIG. 7 shows the absolute value of the early sample as E and the absolute value of the late sample as L, so that |E|−|L|=θerror, where θerror can take on both positive and negative values. When E=4 and L=4, θerror=zero. This occurs at the center of the Figure and at both ends. The ends of the Figure are so called "dead zones" where the data is inverted by 180 degrees as described previously in connection with FIG. 5.

FIG. 8 shows a "flow counter" arrangement 250 as an alternative to the summing network of FIG. 6. This arrangement 250 includes a group of serially connected storage registers 1 through 8, which function as a delay line. The received data RxD at an input terminal 252 is serially clocked through these registers by a clock signal CLK provided at a clock input terminal 254. The serially connected registers are initialized to its lowest output code when a RESET signal is provided at a reset terminal 256. The output terminal 258 of the storage register 8 is connected to one input terminal of a EXCLUSIVE-OR gate 260. The other input terminal of the EXCLUSIVE-OR gate 260 is connected to the RxD input terminal 252. The RxD input terminal 252 is also connected to the up/down U/D control terminal of an up/down counter 262. The output terminal of the EXCLUSIVE-OR gate 260 is connected to the count enable terminal of the up/down counter 262. The load terminal LD of the up/down counter 262 is also connected to the reset terminal 256.

As each input sample is shifted into the delay line formed by the registers, the state of the up/down counter 262 is updated based on the state of the delay line input value and the state of the delay line output value. If the input and output are the same, then the counter does not change its count. If the input is a one while the output is a zero, then the counter increments by one. If the input is a zero and the output is a one, then the counter decrements by one.

In this manner the up/down counter 262 keeps track of samples flowing in and out of the delay line and maintains a count equal to the integral of the samples present in the delay line at any instant in time. Note that the counter is initialized such that it provides 2's complement output coding as indicated in the OUTPUT CODING chart shown in FIG. 8. This coding simplifies the computation of the absolute value later in the phase detector by providing the sign in the most significant bit. 2's complement coding is used for the counter because it makes mathematical computations easier, especially with regard to working with absolute values.

Note that when this type of integrator is used in an early/late gate phase detector, the integration interval is always a fixed length regardless of when the integrator is sampled. This allows the early and late gates to be arbitrarily shifted around during a bit period without affecting their length.

The number of registers making up the delay line in FIG. 8 can be easily expanded because only the RxD input at terminal 252 and the delay line output at terminal 258 are used. In contrast, additional bits in the delay line of FIG. 6 require the use of a larger and consequently slower summer 226.

FIG. 9 shows a timing diagram for phase-locked loop of FIG. 5 for the case where the phase error is equal to zero. When the phase error output of the phase detector is equal to zero, the counter free runs at a sampling rate and provides a count value to the state controller. The state controller uses the count to derive the sampling signals for the phase detector early and late gates.

FIG. 10 shows a timing diagram for phase-locked loop of FIG. 5 for the case where the phase error is positive. When the phase error output of the phase detector is positive, the state controller retards the counter by one count in an attempt to bring the early to late gate transition into alignment with the bit stream transition. This timing illustrated in FIG. 7 shows that the time from when the phase error output is valid to the time when the gate timing needs to be adjusted has been greatly extended over the prior art discussed in connection with FIGS. 3A–3D and 4A–4D. This is because the output of the integrator used by this invention is sampled and does not need to have the start of the integration interval defined as required by the prior art.

FIG. 11 shows a timing diagram for phase-locked loop of FIG. 5 for the case where the phase error is negative. When the phase detector, phase error output is negative, the state controller advances the counter by one count.

FIG. 12 illustrates the capability of a system according to the invention for detecting a dead zone in the transfer function of a phase detector through the use of a sliding integrator. The integrator output equals zero when a bit transition is present within the half bit integration interval. This allows a zero detector placed at the integrator's output to serve as a bit transition detector. This provides a simple method for detecting the dead zone in the transfer function of the phase detector.

The dead zone occurs when the early to late gate transition falls in the middle of a bit rather than on bit boundaries. When this occurs, the phase detector output may indicate that the phase error is zero and the phase locked loop will maintain its current phase which is actually 180° in error. Although noise and timing inaccuracies will eventually pull the phase detector out of the dead zone there is no guarantee on the lock-in time.

This invention detects the dead zone by qualifying the zero phase error state with the position of the bit transition. If the phase detector output is zero and a bit transition is detected in the boundary region between the late and early gates (represented by the signal labeled WINDOW) then the phase detector is operating in the dead zone and its timing is shifted by 90°. This tinting shift is achieved by clearing the counter and forces the phase detector to operate near the peak of its transfer function. This timing is illustrated in FIG. 9.

FIG. 13 shows an alternative to the circuit of FIG. 12. The alternative is to capture the ZERO signal going active during the WINDOW interval and to compare it with the state of the phase error output at the end of the early integration interval, as shown in FIG. 10. This allows additional time to perform the phase error calculation and also allows the digital phase-locked loop according to the invention to operate at a higher rate than the prior art.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. An improved early-late gate digital phase detector for use in a digital phase lock loop having a digitally controlled oscillator which includes a state controller and a counter, the digital phase detector, comprising:

a digital integrator, having an input terminal for receiving binary samples of a data stream, where the sample rate of the binary samples is x times the data rate of the data stream, and having an output terminal at which is provided the sum of a number n of binary samples and having a tapped delay line and a parallel summing network;

a first register for sampling and holding the output value of the digital integrator;

a first absolute value function for taking the absolute value of the output value of first register;

a second register for sampling and holding the output value of the digital integrator;

a second absolute value function for taking the absolute value of the output value of the second register;

a subtractor for combining the absolute value of the output value of the first register and the absolute value of the output value of the second register, said subtractor providing an output error signal.

2. The phase detector of claim 1 wherein the tapped delay line includes a series of storage cells which each have an output terminal, and the parallel summing network has input terminals connected to respective output terminals of the tapped delay line.

3. The phase detector of claim 2 wherein the summing network includes a flow counter.

4. The phase detector of claim 3 wherein the flow counter is initialized to its lowest output code when the tapped delay line is reset; wherein as each input sample is shifted into the delay line, the state of the flow counter is updated based on the state of the delay line input and output values; wherein, if the input and output are the same, then the counter does not change its count; wherein, if the input is a one while the output is a zero, then the counter increments by one; and wherein if the input is a zero and the output is a one, then the counter decrements by one; whereby the flow counter keeps track of samples flowing in and out of the delay line and maintains a count equal to the integral of the samples present in the delay line at any instant in time.

5. The phase detector of claim 3 wherein the counter is initialized such that it provides two's complement output coding, which simplifies computation of the absolute value later in the phase detector by providing the sign in the most significant bit.

6. The phase detector of claim 3 wherein the integration interval is a fixed length regardless of when the integrator is sampled to allow the early and late gates to be arbitrarily shifted around during a bit period without affecting their length.

7. The phase detector of claim 2 wherein the length of the tapped delay line in this case is equal to the early or late gate length, which is half a bit period.

8. The phase detector of claim 2 wherein the tapped delay line includes a shift register.

9. The phase detector of claim 2 wherein an input data signal is sampled at between 8 to 64 times the bit rate and shifted into the delay line.

10. The phase detector of claim 2 wherein the summing network includes full adders that sum up the number of delay line elements containing ONE bits.

11. The phase detector of claim 1 including a zero detector provided at the output terminal of the digital integrator.

12. A digital phase lock loop, comprising:

a digitally controlled oscillator which includes a state controller and a counter;

an early/late gate phase detector which includes:

a digital integrator, having an input terminal for receiving binary samples of a data stream, where the sample rate of the binary samples is x times the data rate of the data stream, and having an output terminal at which is provided the sum of n binary samples, and having a tapped delay line and a parallel summing network;

a first register for sampling and holding the output value of the digital integrator;

a first absolute value function for taking the absolute value of the output value of first register;

a second register for sampling and holding the output value of the digital integrator;

a second absolute value function for taking the absolute value of the output value of the second register;

a subtractor for subtractively combining the absolute value of the output value of the first register and the absolute value of the output value of the second register, said subtractor providing an output error signal.

13. The digital phase lock loop of claim 12 wherein the tapped delay line includes a series of storage cells which each have an output terminal, and the summing network has input terminals connected to respective output terminals of the tapped delay line.

14. The phase detector of claim 13 wherein the summing network includes a flow counter.

15. The digital phase lock loop of claim 14 wherein the flow counter is initialized to its lowest output code when the tapped delay line is reset; wherein as each input sample is shifted into the delay line, the state of the flow counter is updated based on the state of the delay line input and output values; wherein, if the input and output are the same, then the counter does not change its count; wherein, if the input is a one while the output is a zero, then the counter increments by one; and wherein if the input is a zero and the output is a one, then the counter decrements by one; whereby the flow counter keeps track of samples flowing in and out of the delay line and maintains a count equal to the integral of the samples present in the delay line at any instant in time.

16. The phase detector of claim 14 wherein the counter is initialized such that it provides two's complement output coding, which simplifies computation of the absolute value later in the phase detector by providing the sign in the most significant bit.

17. The phase detector of claim 14 wherein the integration interval a fixed length regardless of when the integrator is sampled to allow the early and late gates to be arbitrarily shifted around during a bit period without affecting their length.

18. The phase detector of claim 13 wherein the length of the tapped delay line in this case is equal to the early or late gate length, which is half a bit period.

19. The phase detector of claim 13 wherein the tapped delay line includes a shift register.

20. The phase detector of claim 13 wherein an input data signal is sampled at between 8 to 64 times the bit rate and shifted into the delay line.

21. The phase detector of claim 13 wherein the summing network includes full adders that sum up the number of delay line elements containing ONE bits.

* * * * *